United States Patent
Lyons et al.

[11] 3,772,112
[45] Nov. 13, 1973

[54] WEB CUTTING PROCESS
[75] Inventors: Raymond T. Lyons, Franklin Lakes; Max Pladek, Kearny, both of N.J.
[73] Assignee: Textile Cutting Corporation, Hawthorne, N.J.
[22] Filed: Mar. 24, 1971
[21] Appl. No.: 127,718

[52] U.S. Cl.............. 156/88, 156/251, 156/259, 156/271, 156/278, 156/515, 156/518
[51] Int. Cl............ B32b 31/18, B32b 31/26
[58] Field of Search.............. 156/88, 251, 259, 156/260, 258, 271, 515, 518, 522, 527, 278

[56] References Cited
UNITED STATES PATENTS

| | | | |
|---|---|---|---|
| 2,117,452 | 5/1938 | Robinson et al. | 156/251 X |
| 2,535,029 | 12/1950 | Atanasoff et al. | 156/88 |
| 2,756,819 | 7/1956 | Judelson | 156/88 X |
| 3,609,858 | 10/1971 | Shaw et al. | 156/259 X |
| 2,412,576 | 12/1946 | Giles | 156/259 X |
| 2,728,439 | 12/1955 | Murphy et al. | 156/88 X |
| 2,732,881 | 1/1956 | Anderle | 156/88 |
| 3,061,502 | 10/1962 | MacDonald | 156/259 X |
| 3,087,846 | 4/1963 | Soltis | 156/88 |
| 3,660,205 | 5/1972 | Taylor | 156/515 |
| 3,695,969 | 10/1972 | Highfield et al. | 156/251 |

Primary Examiner—Harold Ansher
Attorney—Johnson & Kline

[57] ABSTRACT

Method for cutting webs of thermoplastic fabric into ribbon widths while heat-sealing the cut edges, which cutting may be accomplished in a continuous process involving the inking of the fabric before or after cutting without changing the speed of the web. The cutting step may be carried out at relatively slow web speed by compressing the web between an unheated cutting blade and a heated support.

11 Claims, 3 Drawing Figures

Patented Nov. 13, 1973

3,772,112

INVENTORS
Raymond T. Lyons
BY Max Pladek

Johnson and Kline
ATTORNEYS

WEB CUTTING PROCESS

It is known to cut wide webs of thermoplastic fabric such as woven nylon into ribbon widths using heated cutters such as heated knives which heat-fuse the cut edges to prevent unraveling of the cut fibers or threads. The knives are formed of metal and are heated to a temperature above the melting point of the fabric, and cutting is effected by compressing the fabric between the hot cutting blade and an unheated support while the web is being transported at a relatively high rate of speed, in the order of about 150 feet per minute.

It is not practical to employ such a cutting procedure in a continuous operation involving the inking of the fabric prior to or subsequent to the cutting operation because the fabric cannot be adequately inked at such a high rate of speed and the cutting operation is unsatisfactory if the speed of the web is reduced to a satisfactory inking speed, in the order of about 50 feet per minute. At the higher speed the fabric cannot absorb or pick up a satisfactory quantity of ink and at the lower speed the hot cutting knife causes excessive fusion of the fabric at the cutting area and a bead of fused material builds up along the cut edges. This bead has a greater thickness than the fabric, reduces the length of ribbon that can be wound on a spool, and may become jammed such as in the ribbon guides of a conventional typewriter.

Also the requirement that the cutting blade must be heated to high temperatures restricts the types of cutting blades that can be used and also reduces the useful life of the cutting blade. Blades having cutting edges of relatively poor heat-conductivity such as glass, heat-resistant plastics, diamond, or the like, are unsatisfactory. Furthermore conventional hardened steel cutting blades lose their sharpness sooner if heated to high temperatures than if unheated.

It is the principal object of this invention to provide a method in which webs of thermoplastic fabric can be inked and cut into ribbon widths in a continuous operation at a uniform rate of web speed.

It is another object of this invention to cut webs of thermoplastic fabric into ribbon widths at a slower speed than heretofore possible while providing at such slower speed ribbon edges which are free of edge deposit or beading.

It is another object of this invention to provide a method and an apparatus for cutting webs of thermoplastic fabric into ribbon widths and heat-sealing the cut edges without the use of hot cutting blades.

These and other objects and advantages of this invention will be apparent to those skilled in the art in the light of the present disclosure, including the drawing, in which.

The present invention involves the related discoveries that there are several advantages of using unheated cutting blades to cut webs of thermoplastic fabric and that it is possible to provide uniform fused ribbon edges, free of edge deposit or beading, by means of a heated backing or support against which the fabric is compressed by means of an unheated cutting blade. The heated backing or support, which may be a continuous heated roller or a series of individual adjustable heated roller segments, is heated to a temperature above the melting temperature of the particular fabric being cut but does not melt the fabric except in areas where the fabric is compressed by the cutting blade into intimate contact with the backing member. Also the heating of the compressed fabric is distributed throughout the area of the fabric compressed against the backing, rather than being limited to the portions actually severed by the cutting blade, so that the fabric is fused along a marginal area adjacent the cut and the degree of fusion gradually decreases inwardly from the cut. Also, since the cutting edge is not heated, it does not melt the fabric to cause a deposit or bead of thermoplastic material along the cut.

Figure 1:
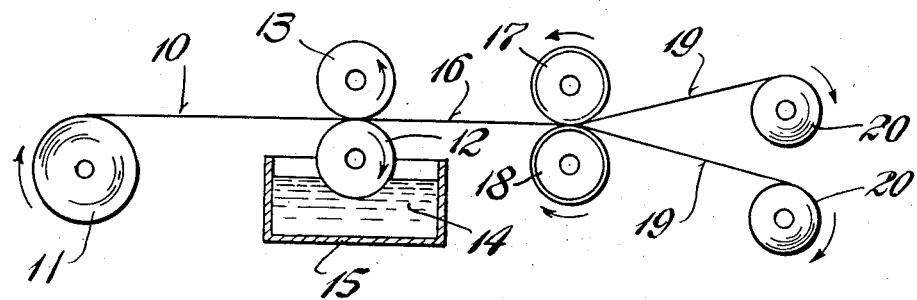
FIG. 1 is a plan view of an apparatus according to one embodiment of the present invention in which the web of fabric is inked prior to being cut.

Referring to the drawing, FIG. 1 illustrates an apparatus for inking a fabric web and then cutting it into ribbon widths. The uninked fabric web 10 is drawn from supply roll 11 in the nip of inking roller 12 and backing roller 13. Inking roller 12 applies a uniform amount of conventional liquid typewriter ribbon ink 14 from vat 15 to the web and the ink is pressed into the web by rollers 12 and 13. The inked web 16 then passes between cutting blades 17 and heated backing rollers 18 where it is cut into ribbon widths and the cut edges are heat-sealed. The inked and cut ribbons 19 are then collected on take-up rolls 20.

Figure 2:
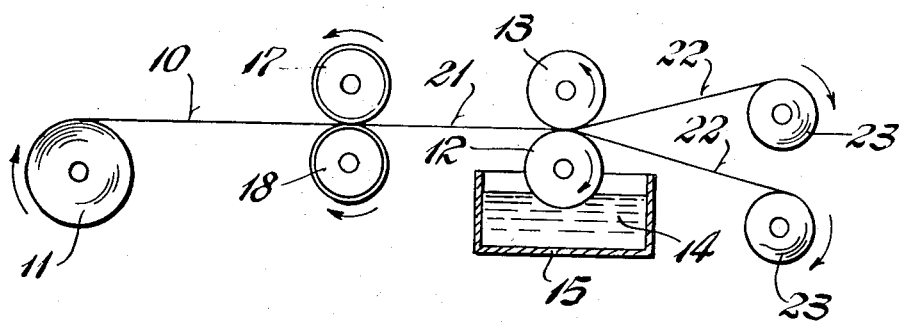
FIG. 2 is a plan view of an apparatus according to another embodiment of the invention in which the web of fabric is inked after being cut into ribbon widths.

FIG. 2 illustrates an apparatus for cutting an uninked fabric into ribbon widths and then inking the cut ribbons. The uninked fabric 10 is drawn from supply roll 11 between cutting blades 17 and heated backing rollers 18 where it is cut into ribbon widths and the cut edges are heat-sealed. The cut web 21 is then passed in the nip of inking roller 12 and backing roller 13 and a uniform supply of liquid ink 14 from vat 15 is pressed into the cut web. The inked and cut ribbons 22 are then collected on take-up rolls 23.

Figure 3:
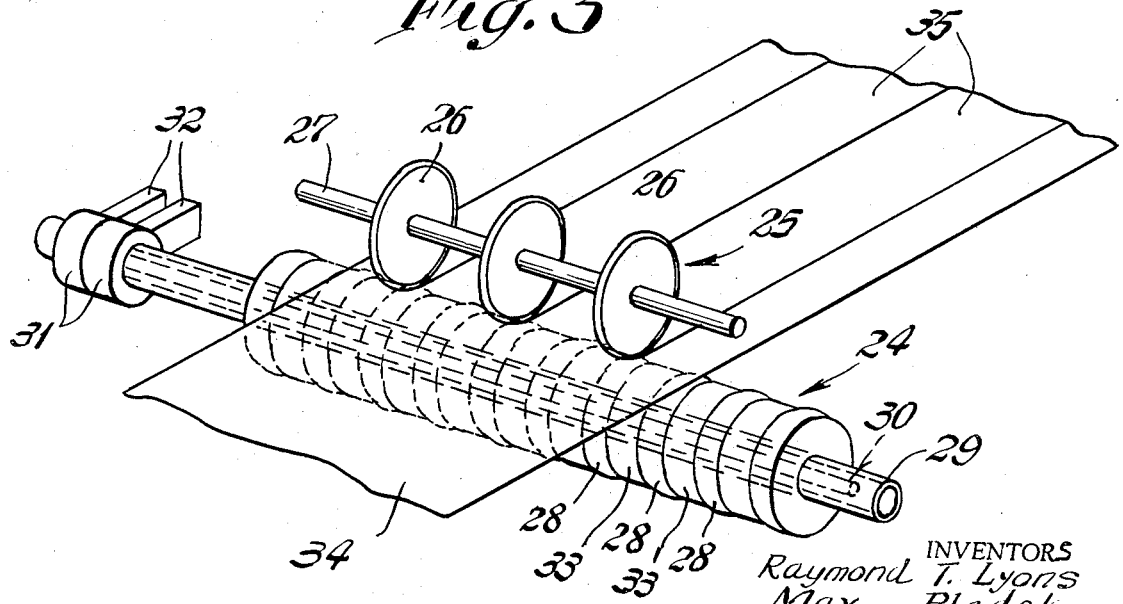
FIG. 3 is a plan view of a cutting blade assembly according to the invention.

FIG. 3 illustrates a cutting assembly useful according to the present invention. A heated backing roller assembly 24 is used in association with an unheated cutting blade assembly 25, the latter comprising a series of spaced cutting blades 26 supported on a shaft 27. The backing roller assembly 24 comprises a series of spaced heated roller segments 28 mounted on hollow heated shaft 29 containing heating rod 30. Heating rod 30 is in electrical contact with slip rings 31, which are insulated from each other. Current is supplied to the slip rings by means of brushes 32 which are connected to a variable voltage supply, thereby heating rod 30 through its resistance. Roller segments 33 space heated roller segments 28 and preferably are also heated and in heat-conductive contact with heated segments 28 in order to assist in maintaining the latter at a uniform temperature.

Heated roller segments 28 preferably have a curved periphery or transversely rounded surface, as illustrated, in order to restrict the contact of the web 34 to those areas which are to be cut. The number and spacing of the adjustable heated roller segments 28 correspond to the number and spacing of the adjustable cutting blades 26 and these elements are aligned so that each cutting blade 26 is in pressure contact with a heated roller segment 28 along its outermost circumference and the distance between blades corresponds to the desired ribbon widths. Thus the areas of the web which are not to be cut are maintained spaced from roller segments 33 and from the curved edges of roller segments 28.

The web 34 passes between the roller assembly 24 and the blade assembly 25 where it is compressed at spaced intervals between the unheated blades 26 and the outermost circumference of the heated roller segments 28. The blades score the web against the heated roller segments while the heated roller segments soften the web in the areas pressed thereagainst by the blades. The softened web cuts easily without melting to a flowable liquid and the heat and pressure cause the fibers, filaments and/or threads at the cut edges of the web to adhere to one another to form a uniform seal. The cut ribbons 35 are free of edge deposit or beading.

Obviously the temperature of the backing roller will vary depending upon the melting point of the particular synthetic thermoplastic fabric being cut, but in all cases the temperature of the backing roller is at least slightly above the melting point of the fabric being cut. Generally the temperature of the backing roller is maintained substantially higher than the melting temperature of the fabric because of the short period of contact and because of the heat-insulating properties of the ink, in the case of pre-inked ribbons. Generally, temperatures within the range of from about 400° to 1,000° F are used.

The following example is given by way of illustration of the use of the apparatus of FIG. 1.

A web 10 of woven nylon fiber (hexamethylene diamineadipic acid polyamide) is expended at a speed of about 50 feet per minute from supply roll 11 into the inking station where it is impregnated with a conventional ribbon ink comprising 65 percent by weight of oleous vehicle and 35 percent by weight of pigment. The inked web 16 passes between cutting blades 17 and backing roller 18 heated to a temperature of from 550° to 700° F to cut the inked web into ribbons 19 having uniformly fused edges free of beading, which ribbons are collected on rollers 20.

The particular nylon fabric has a melting temperature of about 480° F but the brief and limited contact of the fabric with the backing roller, and the presence of the ink, prevent the fabric from being excessively heated.

The same fabric, ink and web speed can be employed with the apparatus of FIG. 2. However the temperature of the backing roller 18 is preferably maintained at the lower end of the range of 550° to 700° F in the apparatus of FIG. 2, where the fabric being cut is uninked, and at the high end of the range in the apparatus of FIG. 1, where the ribbon being cut is inked.

As will be clear to those skilled in the art, the heated backing roller used to carry out the present process may be a continuous smooth wide roller of hardened steel or may be a multiplicity of spaced adjustable narrow rollers, each one in association with an adjustable cutting knife or blade. Such spaced rollers may be present on a common shaft spring-urged against the cutting blades or may be independently mounted on separate shafts they independently spring-urged against the cutting blades.

The cutting blades used according to this invention are not heated and thus need not be heat-conductive or metallic. However hardened steel circular blades are preferred because they retain their sharpness for prolonged periods of time due to the fact that they are not heated to high temperatures and they do not melt the fabric or pick up a deposit of melted fabric. The cutting blades may be mounted on a common shaft, as shown in FIG. 3 of the drawing, or may be mounted on independent shafts. The cutting blades may be spring-urged against the heated backing roller, or vice versa, to provide the necessary pressure contact at each cutting point. While circular, rotatable cutting blades are preferred, this invention also contemplates the use of stationary cutting knives or blades in association with the heated backing roller.

The present invention applies to the cutting of wide webs of synthetic thermoplastic woven fabric of all types suitable for use as duplicating ribbons such as typewriter ribbons. The preferred fabric is based upon nylon polyamide but other fabrics such as Dacron (polyethylene terephthalate polyester fiber), Orlon (polyacrylonitrile fiber), saran (polyvinylidene chloride fiber), rayon (cellulose acetate fiber), and the like, as well as fabrics based upon mixtures of such fibers may also be cut according to the present invention.

The cutting speed may be varied between about 30 and 200 feet per minute depending upon the circumstances. If the ribbon is being inked and cut in a continuous process, then the web speed is at the lower end of the range, i.e., from 30 to about 60 feet per minute, in order to permit for adequate inking of the web, and the temperature of the backing roller is adjusted in order to avoid excess fusion of the cut edges.

Variations and modifications may be made within the scope of the claims and portions of the improvements may be used without others.

We claim:

1. Process for cutting a web comprising synthetic thermoplastic fibers impregnated with a pressure-transferable duplicating ink into ribbon widths suitable for use as duplicating ribbons which comprises passing said web at a uniform speed of from about 30 to 200 feet per minute in the nip between a backing roller heated to a temperature above the melting temperature of said fibers and a multiplicity of spaced unheated cutting blades having sharp edges in pressure contact with said roller, the compression of said web between said sharp edges and said roller causing the compressed fibers to be heated to their melting point, severed by the sharp edges of the cutting blades and fused to adjacent fibers to provide a multiplicity of inked duplicating ribbons having ravel-free cut edges.

2. Process according to claim 1 in which the web is passed at a speed of from about 30 to 60 feet per minute.

3. Process according to claim 1 in which the web comprises woven thermoplastic fibers.

4. Process according to claim 1 in which the thermoplastic fibers comprise nylon polyamide and the backing roller is heated to a temperature within the range of from about 550° to 700° F.

5. Process according to claim 1 in which the cutting blades are circular, rotatable blades of hardened steel.

6. Process according to claim 1 in which a multiplicity of spaced segmented backing rollers, each having a transversely rounded surface, is used in association with the multiplicity of spaced cutting blades.

7. Continuous process for the production of duplicating ribbons comprising the steps of passing a wide web of synthetic thermoplastic fibers at a uniform speed of from about 30 to 200 feet per minute in the nip between a backing roller heated to a temperature above the melting temperature of said fibers and a multiplicity of spaced unheated cutting blades having sharp edges in pressure contact with said roller, the compression of said web between said sharp edges and said roller causing the compressed fibers to be heated to their melting point, severed by the sharp edges of the cutting blades and fused to adjacent fibers to provide fibrous ribbons having ravel-free cut edges, and impregnating said ribbons with pressure-transferable duplicating ink while said ribbons move at the same uniform speed as said web.

8. Process according to claim 7 in which the web comprises woven thermoplastic fibers.

9. Process according to claim 7 in which the thermoplastic fibers comprise nylon polyamide and the backing roller is heated to a temperature within the range of from about 550° to 700° F.

10. Process according to claim 7 in which the cutting blades are circular, rotatable blades of hardened steel.

11. Process according to claim 7 in which a multiplicity of spaced segmented backing rollers, each having a transversely rounded surface, is used in association with the multiplicity of spaced cutting blades.

* * * * *

PO-1050
(5/69)

UNITED STATES PATENT OFFICE
CERTIFICATE OF CORRECTION

Patent No. 3,772,112            Dated November 13, 1973

Inventor(s) Raymond T. Lyons and Max Pladek

It is certified that error appears in the above-identified patent and that said Letters Patent are hereby corrected as shown below:

Column 3, line 7 from the bottom, "they" should read -- and --.

Signed and sealed this 23rd day of April 1974.

(SEAL)
Attest:

EDWARD M.FLETCHER,JR.            C. MARSHALL DANN
Attesting Officer            Commissioner of Patents